US006906862B2

(12) United States Patent
Cross

(10) Patent No.: US 6,906,862 B2
(45) Date of Patent: *Jun. 14, 2005

(54) LENS COATING TO REDUCE EXTERNAL FOGGING OF SCOPE LENSES

(75) Inventor: John W. Cross, Overland Park, KS (US)

(73) Assignee: Bushnell Performance Optics, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 10/827,055

(22) Filed: Apr. 19, 2004

(65) Prior Publication Data

US 2004/0201895 A1 Oct. 14, 2004

Related U.S. Application Data

(60) Division of application No. 10/291,452, filed on Nov. 8, 2002, now Pat. No. 6,816,310, which is a continuation of application No. 09/961,750, filed on Sep. 24, 2001, now Pat. No. 6,542,302, which is a continuation-in-part of application No. 09/451,787, filed on Dec. 1, 1999, now abandoned.

(51) Int. Cl.$^7$ ................................................ G02B 1/10
(52) U.S. Cl. ...................... 359/582; 359/507; 359/580; 359/588
(58) Field of Search ................................ 359/580–582, 359/586–588, 507; 33/507; 351/163

(56) References Cited

U.S. PATENT DOCUMENTS

| | | | |
|---|---|---|---|
| 4,387,960 A | 6/1983 | Tani | |
| 4,726,654 A | 2/1988 | Kimura et al. | |
| 4,765,729 A | 8/1988 | Taniguchi | |
| 4,784,467 A | 11/1988 | Akatsuka et al. | |
| 5,078,791 A | 1/1992 | Singh | |
| 5,204,126 A | 4/1993 | Singh | |
| 5,219,654 A | 6/1993 | Singh | |
| 5,766,698 A | 6/1998 | Singh | |
| 5,897,918 A | 4/1999 | Singh | |
| 6,143,358 A | 11/2000 | Singh | |
| 6,171,652 B1 | 1/2001 | Singh | |
| 6,206,191 B1 | 3/2001 | Singh | |
| 6,542,302 B2 * | 4/2003 | Cross | 359/581 |

OTHER PUBLICATIONS

Letter from Jones,Day,Reavis & Pogue; Aug. 29, 2002; H. Duane Switzer; 2 pages with 4 attachments.
Statement Under 37 CFR 1.97(e)(2) (1 page).
Declaration of John W. Cross (2 pages).
All Top–Coatings are not created Equal—the Permaseal™ Story.
Handbook of Optics, vol. 1, 2nd ed., Michael Bass et al., Chapter 42, pp. 42.3 to 42.17 by McGraw–Hill Book Co.
Design of Optical Interference Coatings Alfred Thelen, Chapter 2, pp. 85–93 by McGraw–Hill Book Company.

* cited by examiner

*Primary Examiner*—Drew A. Dunn
*Assistant Examiner*—Joshua L Pritchett
(74) *Attorney, Agent, or Firm*—Hovey Williams LLP

(57) ABSTRACT

A coated lens for use in a riflescope, telescope, spotting scope, binoculars, or the like is provided. The coating on the lens comprises two layers, an anti-reflective layer adjacent the lens and a hydrophobic layer disposed on the anti-reflective layer. The hydrophobic layer preferably includes an organosilane compound. Advantageously, the coating does not significantly reduce light transmission through the lens.

3 Claims, 3 Drawing Sheets

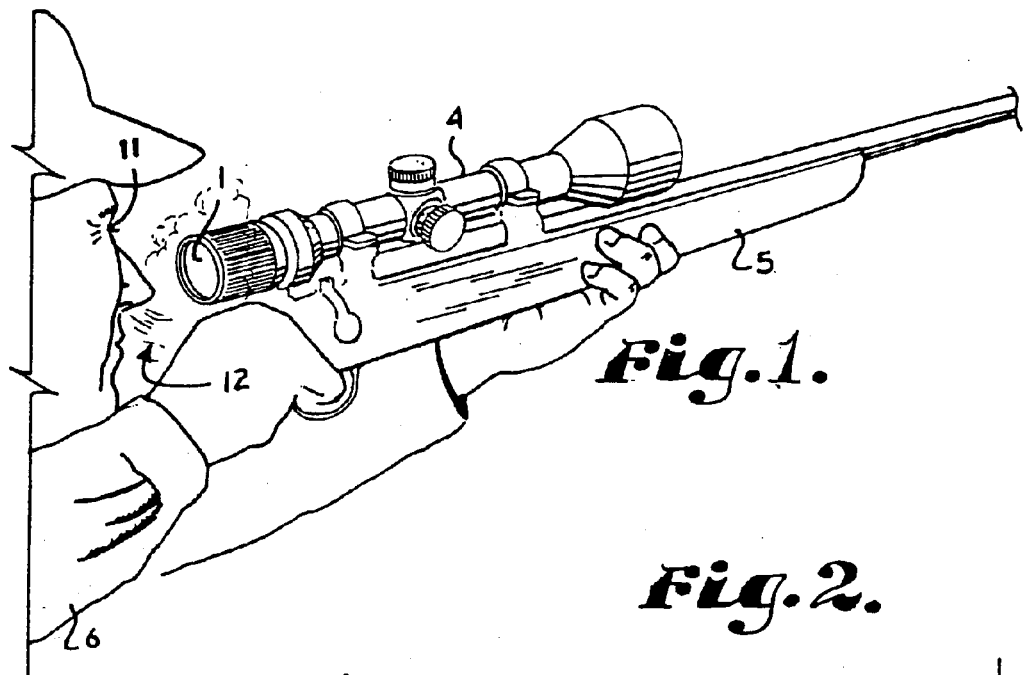
Fig.1.
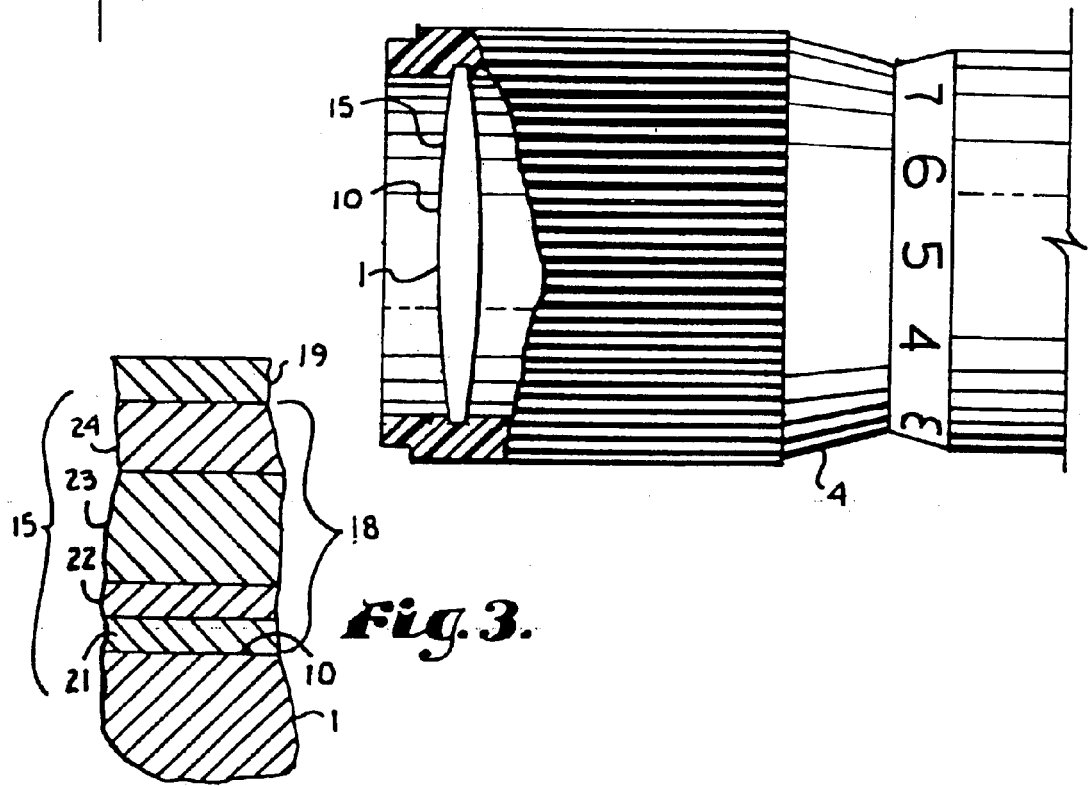
Fig.2.
Fig.3.

LENS COATING TO REDUCE EXTERNAL FOGGING OF SCOPE LENSES

RELATED APPLICATIONS

This application is a divisional of application Ser. No. 10/291,452, filed Nov. 8, 2002 U.S. Pat. No. 6,816,310 which was a continuation of application Ser. No. 09/961,750, filed Sep. 24, 2001 U.S. Pat. No. 6,542,302 which was a continuation-in-part of application, Ser. No. 09/451,787, filed Dec. 1, 1999 now abandoned.

BACKGROUND OF THE INVENTION

1. Field of the Invention

The present application is directed toward a coating for an exterior surface of a telescope lens, especially a riflescope, a spotting scope, or a binocular to reduce the likelihood of fogging or distortion due to the collection of moisture on the lens without significantly reducing light transmission through the lens in the visible range. More particularly, the present invention is directed toward such coatings that are durable. Still more particularly, such coatings may include two layers with the first layer being an anti-reflective (AR) coating which has either a single layer or multiple layers such that light transmission in the visible range is not significantly reduced and the second coating is a durable hydrophobic coating over the AR coating. Still more particularly, the present invention provides a coating which is not easily scratched or worn away undergoing standard durability and abrasion testing.

2. Description of the Prior Art

Scopes used by sportsmen, military and the like, have improved significantly over the years. However, much of this improvement is lost on cold days or rainy days due to collection of moisture or fogging on the lens which then significantly distorts the image. For example, a hunter on a cold day will often bring the gun to his face to aim through a scope at a target, and in doing so often breathes on the scope's lens. The hunter's breath then fogs the lens. On days when it is raining or drizzling, the moisture from the rain can likewise collect on the lens and distort the image. While the interior face of the lens can be protected against the elements by placement of a moisture free gas within the interior of the scope, the exterior face of the lens is invariably exposed to the elements and incurs the fogging and moisture collection noted above.

Various treatments have been previously utilized that apply hydrophobic materials to various articles, such as sunglasses and automobile windshields, to produce beading of water droplets/or the quick sloughing of moisture, so that the moisture is not retained and spread unevenly on the article due to surface tension so as to produce distortion. However, such treatments reduce the transmissions of light through the article. Typically this reduction in transmission occurs even if the treatment is essentially clear or see through, since the index of refraction of the treatment is different in comparison to the index of refraction of the article causing some amount of reflection to occur. The light that is reflected is then not seen by the viewer which reduces the quality of the image. In articles such as windshields and sunglasses, the amount of reduction in light transmission is not critical, and therefore, a loss of a small amount is not considered to be extremely important.

However, in riflescopes and other telescopic devices, it is extremely important to maintain light transmission in the visible range near 100 percent of incident light in order to ensure that the best possible quality image is seen through the scope. Conventional treatments for rendering articles hydrophobic reduce the transmission of light in certain visible ranges sufficiently to make use of such treatments unacceptable.

Anti-reflective treatments are used on various materials to decrease reflection and increase transmission of light, especially in certain wavelengths. Anti-reflective treatments have been previously used in the prior art for various types of devices, including lenses. Anti-reflective treatments have been especially used where lenses with multiple components are joined together in a side-by-side (or layered) relationship. However, hydrophobic polymers that naturally reduce transmission of light do not adhere to most of the components of anti-reflective treatments that increase transmission of light. Even if the hydrophobic polymer will adhere to an anti-reflective, it has been found through testing that the hydrophobic polymer can often easily be removed by rubbing or just general wear over time.

Consequently, it is desirable to provide an overall coating for an exterior face of a riflescope lens or the like, which includes an externally located hydrophobic polymer that transmits light in the visible range and causes quick beading and sloughing of moisture from the lens. Furthermore, the hydrophobic polymer requires an anti-reflective component that is designed to allow almost one hundred percent of visible light at selected wavelengths to be transmitted through the lens and the hydrophobic polymer. Still furthermore, it is important that the hydrophobic coating be strongly adhered to the lens and not easily removed by rubbing or wear over time. Additionally, what is needed is a hydrophobic lens coating having a certain hardness or durability which provides a certain degree of protection for the lens or any AR layers located on the lens such that the coating is not easily scratched. In this respect, it is desirable that the hydrophobic lens coating be of sufficient hardness and durability to undergo conventional testing without significant damage to the hydrophobic coating, any AR coating, or the lens itself.

SUMMARY OF THE INVENTION

The present invention overcomes the problems inherent in the prior art and provides a distinct advance in the state of the art. A coating is provided for lenses to render the exterior face or surface of the lens hydrophobic to reduce the likelihood of fogging and to reduce the likelihood of distortion of images passing through the lens by collection of water thereon. The coating comprises two layers; the first layer being an anti-reflective treatment and the second layer being a light transmitting hydrophobic polymer treatment.

The anti-reflective layer includes multiple sublayers, the material of construction of which and the thickness of which are chosen to provide the best transmission of selected wavelengths through the lens in conjunction with the particular hydrophobic polymer utilized. The number of sublayers in the anti-reflective layer may vary in accordance with design techniques and typically range from three to seven in number. Preferably, the anti-reflective layer has four sublayers.

The outer layer of the anti-reflective layer, that is the layer opposite the lens and adjacent the hydrophobic layer is constructed of silicon dioxide. The anti-reflective layer is applied in ways well known in the art. However, in order to make the hydrophobic polymer layer wear resistant, it is best to heat the anti-reflective layer above ambient temperature. Preferably the anti-reflective layer is heated to a temperature in the range of 250–300° centigrade provided that the lens is constructed of glass that can withstand such temperatures. In alternative methods, the anti-reflective coating is applied to a lens using vapor deposition or sputtering.

Alternatively, the outer layer of the anti-reflective layer can be formed of any conventional AR coating and it is desirable to select each AR layer based upon the desired AR characteristics of the final product. Of course, this is also true for single-layer AR coatings.

While the anti-reflective layers may be constructed of numerous types of materials, one particular preferred embodiment includes 70 nanometers of aluminum oxide ($Al_2O_3$), 70 nanometers of $ZrO_3$, 225 nanometers of $MgF_2$ and 140 nanometers of $SiO_2$ where it is desired that the wavelength of visible light at 550 nanometers be most clearly and completely transmitted through the lens.

One preferred method of applying this coating (including both an AR layer and a hydrophobic coating) generally includes the steps of applying an AR coating to a lens under vacuum in a first chamber and then having the hydrophobic coating applied to the AR-coated lens applied using vapor deposition in a second vacuum chamber. Another preferred method applies the AR coating to a lens using sputtering with the final layer being sputtered on being the hydrophobic coating. This process is especially adapted for AR coatings which do not incorporate silicon dioxide as the layer occurring just beneath the hydrophobic coating as any AR layer could be used.

In one aspect of the present invention, a coating is applied to a lens which has an AR coating thereon. In other words, the lens has at least two layers on one of the surfaces. The first layer is the AR layer and the second layer is the hydrophobic coating. The AR layer can be of any AR material and may be comprised of several layers of different AR materials. On top of this AR layer, the hydrophobic coating is applied. This hydrophobic coating is preferably a coating which does not significantly affect light transmission and which provides a durable outer layer which is not easily scratched or marred. The hydrophobic coating should also adhere to the underlying AR layer such that it is not easily removed. The hydrophobic coating is preferably an organosilane compound. Preferred organosilane compounds applied to lenses will retain at least 95% of its hydrophobic characteristics after undergoing a standard eraser test. Still more preferably, the hydrophobic coating will retain at least 97% (and even more preferably at least 98.5%) of its hydrophobic characteristics after undergoing a standard eraser test. Most preferably, the hydrophobic coating will retain at least 99.5% of its hydrophobic characteristics after undergoing a standard eraser test. One method of testing the hydrophobic characteristics would include measuring the contact angle of a water drop both before and after the eraser test. Furthermore, when undergoing a standard adhesive tape test, the coating should retain less than 5% of the applied stain with the remaining 95% being removed by the adhesive tape. Still more preferably, the hydrophobic coating will permit removal of at least 97% (and even more preferably at least 98.5%) of the stain undergoing a standard adhesive tape test. Most preferably, the hydrophobic coating will permit removal of at least 99.5% of the applied stain after undergoing a standard adhesive tape test. With respect to light transmission, the hydrophobic coating should have little to no effect and riflescopes containing a plurality of lenses therein should exhibit less than a 5% loss of light through the lenses. Preferably, any one lens having an AR coating on each side of the lens and a hydrophobic coating applied to at least one of the sides of the lens should have at least 99% light transmission therethrough. A particularly preferred organosilane compound is PERMASEAL (Nanofilms, Inc., Valley View, Ohio).

Therefore the principle objects of the present invention are: to provide a telescope lens having an external face that is treated with a coating to resist accumulation of water on the lens to reduce the likelihood of fogging and to reduce the likelihood of distortion due to collection of moisture acting under surface tension thereon; to provide such a lens having a high percentage of transmission of light in the visible range; to provide such a lens wherein the coating comprises a anti-reflective layer and a hydrophobic polymer layer on the surface of the lens; to provide such a lens wherein the anti-reflective layer has a sublayer of silicon dioxide that is adjacent to the hydrophobic layer; to provide such a lens wherein the anti-reflective layer is heated during manufacturing and while on the lens to a temperature above ambient temperature and preferably to a temperature in the range of 250–300° centigrade; to provide such a lens that has very close to 100% transmission of light over a very wide spectrum of visible light; to provide a lens having an AR layer and a hydrophobic coating on top of the AR layer wherein the hydrophobic coating provides increased durability while having little to no effect on light transmission; and to provide such a lens which is relatively easy to construct, inexpensive to produce and especially well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a hunter utilizing a rifle with a riflescope having a lens treated in accordance with the present invention;

FIG. 2 is a fragmentary side elevational view of the riflescope, with portions broken away to show placement of the lens therein;

FIG. 3 is a fragmentary and very highly enlarged cross-sectional view of the lens and various coating layers on the surface of the lens;

DETAILED DESCRIPTION OF THE INVENTION

Figure 4:
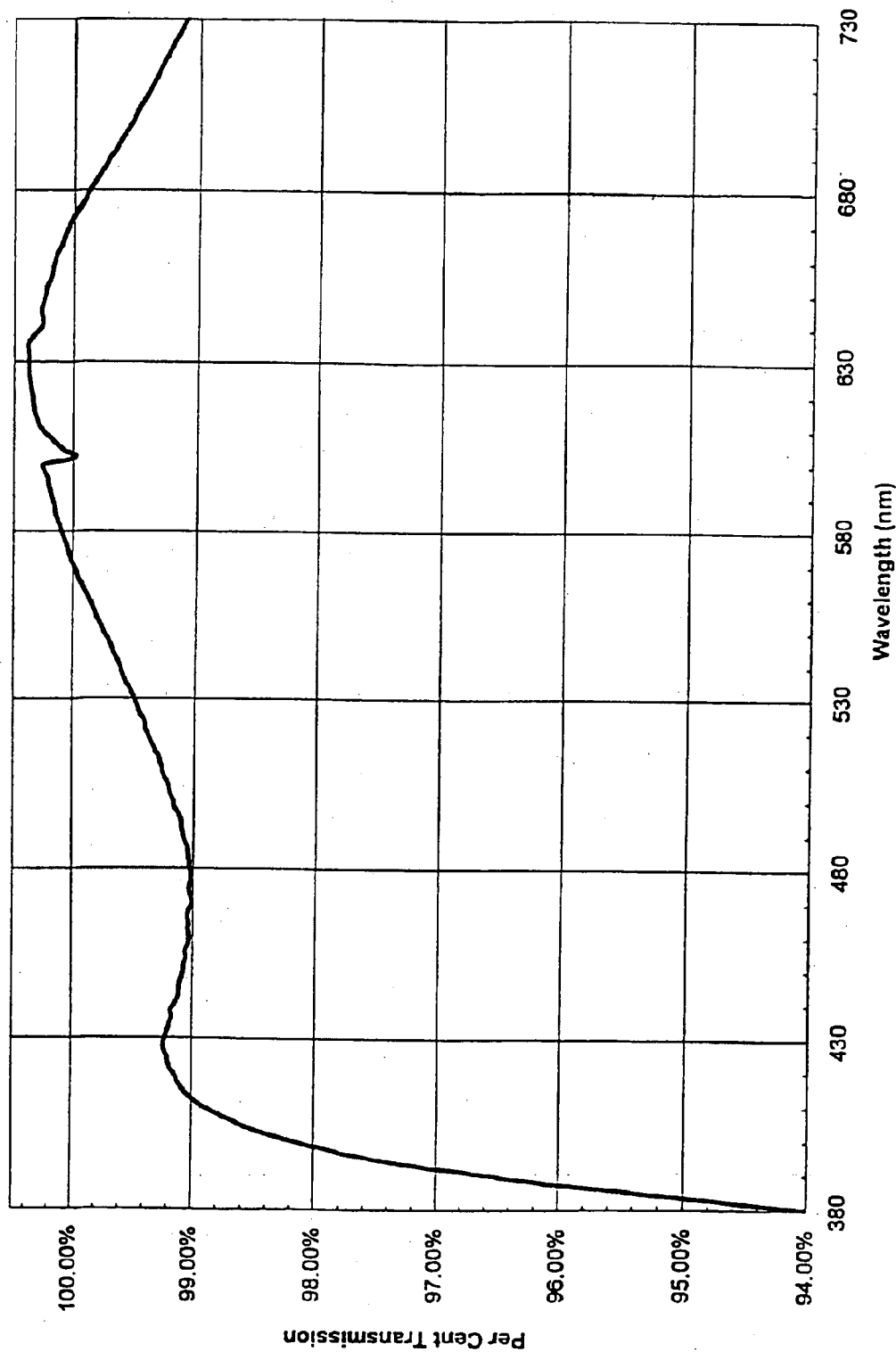
FIG. 4 is a graphical representation of light transmission through the lens at various wavelengths.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally indicates a lens in accordance with the present invention mounted in a riflescope 4 that is in turn mounted on a rifle 5 that is illustrated as being aimed by a user 6 in FIG. 1.

The scope 4 is of a type conventionally used on rifles by sportsmen and the like, although it is foreseen that many types of telescope systems such as binoculars, spotting scopes and the like may be treated with the present invention. The scope 4 may include multiple internal lenses and related internal components which are quite conventional and are not illustrated in detail or highly described herein. The invention is specifically directed to the lens 1 which has an external face 10 that is exposed to the ambient environment, especially rain and the breath of the user.

The lens face 10 is positioned during use in front of an eye 11 of the user 6 and in doing so, the user 6 often exhales a breath 12 that is supersaturated with moisture from the lungs of the user 6. The user's breath 12, as well as falling or driven rain or mist, engages the lens external face 10. Under typical circumstances, the breath 12 upon striking the lens face 10 or rain or mist on the lens face 10 will cause the lens 1 to fog or the images seen therethrough to become distorted due to surface tension acting on the moisture on the lens 1.

Consequently, in accordance with the present invention, the lens face 10 is covered with a coating 15 that reduces surface tension and causes beading of moisture, thereby significantly reducing the likelihood of image distortion through the lens 1 due to moisture collecting thereon. The coating 15 is very thin in thickness and does not show as a separate layer in FIG. 2 for this reason. The coating 15 is best illustrated in FIG. 3 which is highly enlarged fragmentary view of a portion of the lens 1 and coating 15. The entire thickness of the coating 15 will typically be less than 1000 nanometers (nm). In order to not affect light transmission, the coating must be very thin as compared to the wavelength of light of interest. For example for a wavelength of 550 nm, the coating must be much thinner than 550 nm. Preferably, the coating is less than 50 nm thick. The coating 15 includes an anti-reflective layer 18 and a hydrophobic layer 19.

The anti-reflective layer 18 is best specifically designed or engineered for the particular lens 1 and hydrophobic layer 19 utilized therewith. Design of anti-reflective layers, such as layer 18, is somewhat both an art and a science. Conventionally there have been many different types of anti-reflective layers that have been developed for various lenses and for various purposes.

The typical anti-reflective layers include multiple sub-layers which are each made of materials which are different from adjacent sub-layers and which are typically deposited in thicknesses wherein the thickness of each sublayer is related to an even whole number division of the wavelength of light that is most preferred to be transmitted through the lens 1.

For example, light that has a wavelength of 550 nm and is approximately in the middle of the visible range is typically considered to be an important wavelength to be transmitted through the lens 1. Therefore, the sub-layers of the anti-reflective layer 18 may be chosen to be deposited in proportion to the 550 nm wavelength. As an example, a common coating that is three sub-layers in thickness is often deposited in layers that are ¼, ½ and ¼ of the length of the wave of the wavelength or 140 nm, 220 nm, and 140 nm in thickness. The art associated with production of anti-reflective coatings and how to deposit such coatings on articles is well known to those having ordinary kills in the art. In particular, the art of designing and depositing anti-reflective layers on objects can be found in such references as the *Handbook of Optics* by McGraw Hill, $2^{nd}$ Ed., in Chapter 42, Dealing with Optical Properties of Films and Coatings, *Design of Optical Interference Coatings* by McGraw Hill Book Company in Chapter 4 on Anti-Reflection Coatings, as well as in issued U.S. patents to Kimura et al., U.S. Pat. No. 4,726,654, Akatuska et al., U.S. Pat. No. 4,784,467 and Tani, U.S. Pat. No. 4,387,960, which are all included here in reference.

Anti-reflective coatings may include sublayers of many different materials, some of which are as follows: $Al_2O_3$, $ZrO_3$, $MgF_2$, $SiO_2$, cryolite, LiF, $ThF_4$, $CeF_3$, $PbF_2$, ZnS, ZnSe, Si, Ge, Te PObTe, MgO, $Y_2O_3$, $Sc_2O_3$, SiO, $HfO_2$, $ZrO_2$, $CeO_2$, $CeO_2$, $Nb_2O_3$, $Ta_2O_5$, and $TiO_2$. These different compositions are chosen by those having skill in the art to best mate and match with the other materials used in the construction of the lens 1 so as to provide the transmission of light at selected advantageous wavelengths. Preferably, for the present invention, it is desired to have the transmission of light be as close as possible to 100% of the incident light across the entire spectrum of visible light, but especially in the center of the spectrum.

In the present invention, it is desirable to have an anti-reflective layer 18 that functions well in cooperation with the hydrophobic layer 19 to provide transmission of light through a wide range of wavelengths, especially light having a wavelength of 550 nm. Consequently, preferred for this invention are anti-reflective layer 18, sublayers 21 through 24 with sublayer 21 being adjacent to the lens face 10 and with sublayer 24 being adjacent to the hydrophobic layer 19. The preferred composition and thickness of the sublayers is as follows: approximately 70 nm of $Al_2O_3$; approximately 70 nm of $ZrO_3$; approximately 225 nm of $MgF_2$, and finally approximately 140 nm of $SiO_2$. For embodiments of this particular invention where the AR layer and the lens are heated to between 250–300° C. before applying the hydrophobic layer, it has been found that it is important to have the final sublayer, in this case sublayer 24, be silicon dioxide to bind with the hydrophobic layer. Most of the other components normally utilized in anti-reflective layers are unsuitable for direct binding with the hydrophobic layer 19; however, it is foreseen that there may be one or more compounds other than silicon dioxide that may be used as the final sublayer, provided that such a compound offers a suitable binding for the particular hydrophobic polymer used. In embodiments where the AR layer and lens are not heated to between 250–300° C., virtually any conventional AR compound can be adjacent the hydrophobic coating.

Prior to deposition of the hydrophobic layer 19 during manufacturing the lens 1 with the anti-reflective layer 18 thereon is heat-treated above ambient temperature. While different temperatures may be utilize for different lens constructions, it has been found that heating the lens between 250–300° C. provides a very stable anti-reflective layer 18 which is not easily removed by scratching, rubbing or normal wear. Such heat treating is not available for any devices where the lens is constructed of plastic or of a composite material that does not lend itself to application of heat.

Subsequent to the anti-reflective layer 18 being applied to the lens 1, the hydrophobic layer 19 is applied. Typically, the hydrophobic layer generally allows full transmission of light in the normal vision range (especially at a wavelength of 550 nm) and is composed of a hydrophobic polymer. The hydrophobic layer may be applied in a layer that is as little as several nm in thickness. The hydrophobic layer 19 may be applied by dipping the lens 1 with the anti-reflective layer 18 there into a liquid bath of the hydrophobic polymer which then adheres to and binds with the silicon dioxide sublayer 24, through vapor deposition or by other suitable methods. Various hydrophobic materials may be utilized that are well known to those skilled in the art, but are especially chosen by those having skill in the art in conjunction with the materials of construction of the lenses, and the anti-reflective layer 18 to function therewith so as to provide high light transmission.

Using another preferred method in accordance with the present invention, the hydrophobic coating is applied to an AR-coated lens by loading an ampule containing the hydrophobic coating into DAS Series (Denton Vacuum, Moorestown, N.J.) vacuum system. Prior to loading the ampule, the DAS system was started using the System Start button and the chamber walls where heated to operating temperature (40–60° C.). Once the walls are at the operating temperature, the ampule was loaded into the heater/breaker assembly and the screen above the assembly was replaced. The lenses were loaded into a basket in the chamber and the chamber door closed before pressing the start button. The door was held closed until the roughing valve opened. Once the roughing valve opened, the mechanical pump evacuated the air from the chamber and the isolation valve opened to connect the Granville Phillips vacuum relay to the chamber. The ampule heater heated the ampule to the first set point (140–170° C.) where is was held until the vacuum set point was reached. The roughing valve remained open until the vacuum set point ($5 \times 10^{-2}$ Torr) was reached and the LED on the Granville Phillips relay turned green. Once the set point was reached, all valves closed and the deposition process began. The ampule was heated to the second temperature set point (220° C.) whereupon the ampule was broken by the solenoid. The process is stopped for two minutes at this point to allow the chemical reaction to take place at the surface of the lenses. When the top of the ampule is broken off, the liquid in the ampule has already been heated to vaporize and the chemical in the ampule disperses throughout the chamber to deposit the hydrophobic coating on the lenses. Once the deposition process is complete, the bypass valves open and the chamber is evacuated through the acid neutralization trap for two minutes. After this second pump down of the chamber, the bypass valves close and the isolation valve opens. The vent valve then opens to vent the chamber to the atmosphere whereupon the end indicator light flashes and an audible alarm sounds to notify the operator that the process is complete.

Illustrated in FIG. 4 is a graphical representation of light transmission as a percentage of incoming light through a lens that has been treated with a coating 15 in accordance with the present invention. As can be seen from the graph, light transmission over the range of from 430–730 nm is within 1% of incident light. It is noted that the percentage of transmission goes slightly above 100% over a small amount of the range due to expected small amounts of error in testing(signal-to-noise problems which would disappear if the data were collected at a slower rate).

Figure 5:
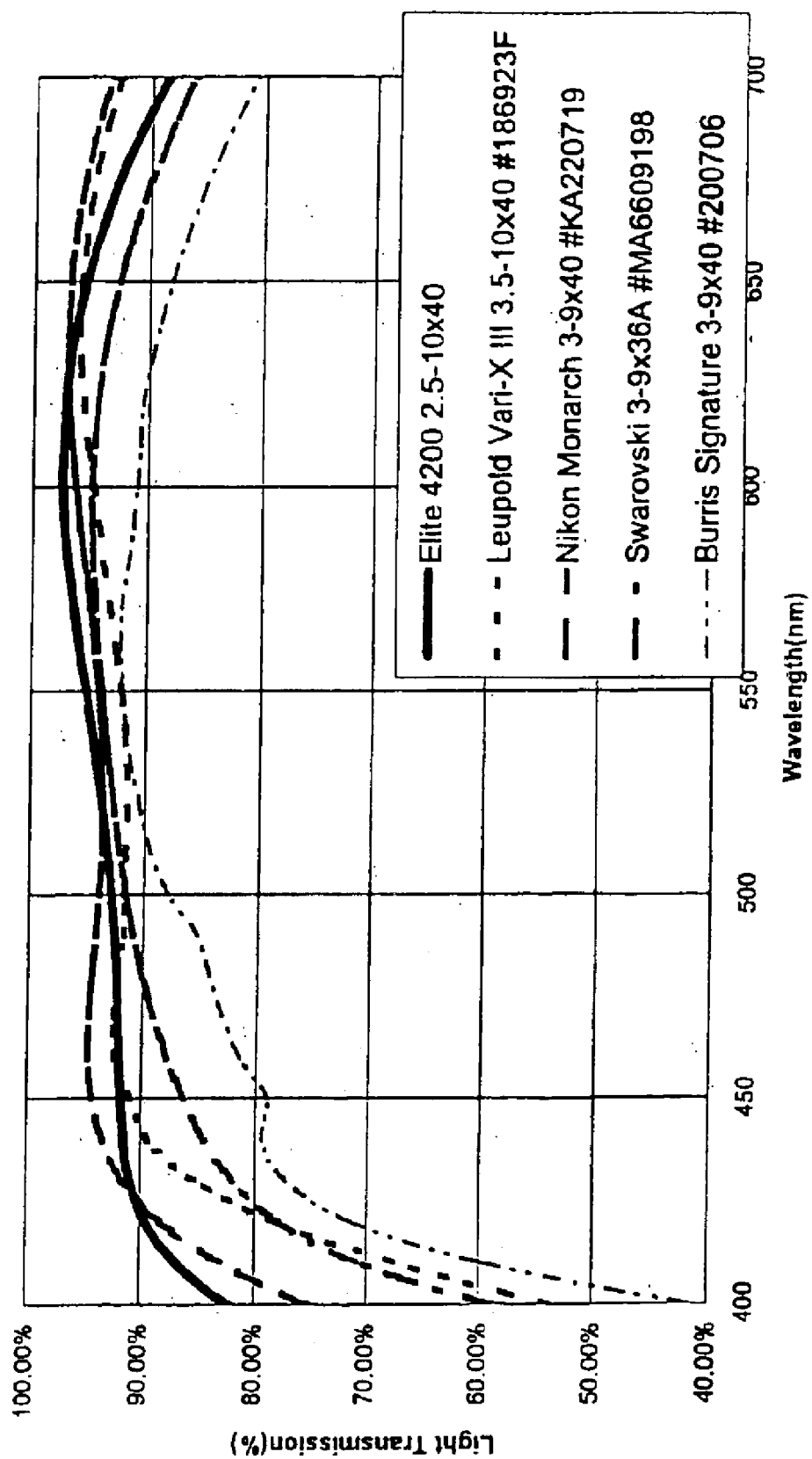
FIG. 5 is a graph illustrating the light transmission through a riflescope in accordance with the present invention in comparison to other riflescopes.

FIG. 5 illustrates light transmission through a riflescope in accordance with the present invention in comparison to other riflescopes of similar construction but lacking the hydrophobic coating of the present invention. As shown in this figure, over 95% of the light at 550 nm was transmitted through the riflescope. This is a great improvement over the next highest performing riflescope which permitted just over 94% of the light to be transmitted through the riflescope.

Durability of a lens produced in accordance with the present invention exhibited superior results in both the standard eraser test and in the standard adhesive tape test. The standard eraser test was performed using an eraser insert complying with military specification MIL-E-12397B. The eraser was pressure fitted into the tester before performing the test. For the test, a lens having a hydrophobic coating in accordance with the present invention was tested by pressing the eraser against the lens at a pressure of 2.5 pounds. This pressure is indicated on the indicator rod of the body of the tester containing the eraser insert. The surface of the lens was rubbed with 20 strokes of the eraser wherein each stroke was about one inch in length. All strokes were made on one path. The lens was then washed with acetone and inspected for deterioration of the coating. No visible deterioration was detected after placing a drop of water on the area of the lens which had been rubbed with the eraser. Further testing of the contact angles of the water drop would confirm that the lens with the coating retained at least 95% of its hydrophobic characteristics after undergoing the test. Depending upon the method of applying the hydrophobic coating, the coatings will retain between 95–100% of their hydrophobic characteristics after undergoing the standard eraser test. Another method of testing the retention of hydrophobic characteristics as well as durability of the coating generally includes the step of performing the standard eraser test (as described above) and marking the lens in a direction transverse to the eraser strokes. The marking of the lens is generally done with a marker whereupon a strip of adhesive tape is placed over the mark and then removed. Preferably, at least 95% of the mark should be removed by the tape and the present invention exceeds this benchmark.

A second test of durability is performed according to MIL-C-675C and MIL-F-48616. For this test, a strip of tape approximately 1.5 inches in length has approximately half of its length pressed onto the coated surface to be tested. The other half of the tape is held at an angle away from the surface and the pressed portion of the tape is pulled up quickly. The coating of the present invention passed this test as no coating was removed after the tape was lifted. Similarly, a second test was performed according to MIL-M-13508. For this test, approximately one inch of tape was placed over a portion of the coated surface such that the tape overlapped an edge of the object which was coated. The tape was pressed down on the coated surface as well as over the edge and then slowly removed. The coating of the present invention also passed this test as no coating was removed after the tape was lifted.

A third test of durability tests for crosshatch adhesion of the anti-reflective layer and the hydrophobic layer. To perform the test, a lens having an anti-reflective layer and a hydrophobic layer in accordance with the present invention was cleaned. A blade was used to make 6 incisions towards the edge of the lens. Six additional incisions were then made perpendicular to the first 6 incisions so that the combination of the incisions resembled a grid pattern. The dust and particles were removed from the grid with compressed air and the lens was inspected to ensure that the grid contained no chips and that the incisions were even. Adhesive tape (Scotch #600, 3M) was then applied over the cross hatch pattern with one end of the tape extending past the edge of the lens by at least ½ inches. The tape was pressed against the lens to remove any air bubbles trapped between the lens and the tape. Within 90 seconds (+/− 30 seconds), the adhesive tape was removed by holding the lens firmly, grasping the extended end of the tape and pulling it rapidly to the other side of the lens as close to an angle of 180° as possible. The entire operation was repeated two more times over a testing period of 24 hours for each of the 10 lenses tested.

Results were scored on a scale of 1 to 5 in four categories after 8, 16 and 24 hours. The categories were: crazing;

delamination (interlayer detachment; delamination (complete coating detachment); and crosshatching. For the crazing assessment, lenses having no visible crazing received a score of A5, lenses having hairline crazing only just visible points or cracks received a score of A4, if hairline crazing covered up to 25% of the lens surface, a score of A3 was given, if hairline crazing covered up to 75% of the lens surface, a score of A2 was given, if hairline crazing covered the entire lens surface, a score of A1 was given, and if any region of the lens had severe Fern-like or Matt-like crazing, a score of A0 was given. Out of the 10 lenses tested, 8 lenses received a score of A4, 1 received a score of A3, and 1 received a score of A5. There were no changes in the testing over the testing period (i.e. at 8, 16, and 24 hours).

In the interlayer delamination category, a score of B5 indicated no delamination over the entire lens surface, B4 indicated partial delamination of individual layers covering up to 25% of the lens surface, B3 indicated partial delamination of individual layer covering up to 75% of the lens surface and B2 indicated total delamination of individual layer over the entire lens surface. All lenses received a score of B5 in this test over the entire testing period.

In the delamination complete coating detachment category, a score of C5 indicated no delamination of all layers over the entire lens surface, C4 indicated partial delamination of all layers covering up to 25% of the lens surface, C3 indicated partial delamination of all layers covering up to 75% of the lens surface and C2 indicated total delamination of all layers over the entire lens surface. All lenses received a score of C5 in this test over the entire testing period.

Finally, in the crosshatch category, a score of D5 indicated that the edges of the cuts were completely smooth and none of the squares of the cross hatched area were detached, a score of D4 indicates that small flakes of the coating are detached at the intersections of the squares and the area affected is less than 5% of the total area, a score of D3 indicates that small flakes of the coating are detached along the edges and at the intersections of the squares and the area affected is between 5% and 15% of the total area, a score of D2 indicates that the coating has flaked along the edges and on parts of the squares and the area affected is 5% to 15% of the total area, a score of D1 indicates that the coating has flaked along the edges of the cuts in large ribbons and whole squares are detached and the area affected is 35–65% of the total area, a score of D0 indicates worse flaking and detachment than a score of D1. A lenses received a score of D5 in this test over the entire testing period.

In summary, the coating 15 of the lens 1 is highly effective at providing a surface coat of a hydrophobic polymer to produce beading of moisture on the surface of lens 1 and reduce the effect of the moisture in distorting images passing through the lens 1. The anti-reflective layer 18 cooperates with the hydrophobic polymer layer to provide transmission of very close to 100% of the light at the wavelengths associated with the normal field of vision that passes through the scope 4, and therefore provides the user 6 with a very high quality image as seen through the lens 1.

It is to be understood that while certain forms of the present invention have been illustrated and described herein, it is not to be limited to the specific forms or arrangement of parts described and shown.

What is claimed is:

1. A lens coating comprising:

an anti-reflective layer comprising from about 3–7 sublayers, each of said sublayers comprising an anti-reflective composition; and a hydrophobic layer on top of said anti-reflective layer, said hydrophobic layer comprising an organosilane compound, said coating retaining at least 95% of a hydrophobic characteristic after undergoing a test comprising the steps of rubbing an eraser for at least 20 strokes along the same line using 2.5 pounds of pressure on the eraser, said hydrophobic characteristic being selected from the group consisting of a comparison of water contact angles before and after said test and a stain removal test using adhesive tape.

2. A lens and coating comprising:

a lens; and a coating disposed on said lens, said coating comprising an anti-reflective layer and a hydrophobic layer, said anti-reflective layer comprising from about 3–7 sublayers, each of said sublayers comprising an anti-reflective composition, said hydrophobic layer being located on top of said anti-reflective layer and comprising an organosilane compound, said coating retaining at least 95% of a hydrophobic characteristic after undergoing a test comprising the steps of rubbing an eraser for at least 20 strokes along the same line using 2.5 pounds of pressure on the eraser, said hydrophobic characteristic being selected from the group consisting of a comparison of water contact angles before and after said test and a stain removal test using adhesive tape.

3. A scope comprising:

a housing;

a lens in said housing; and a coating on said lens, said coating comprising an anti-reflective layer and a hydrophobic layer, said anti-reflective layer comprising from about 3–7 sublayers, each of said sublayers comprising an anti-reflective composition, said hydrophobic layer being located on top of said anti-reflective layer and comprising an organosilane compound, said coating retaining at least 95% of a hydrophobic characteristic after undergoing a test comprising the steps of rubbing an eraser for at least 20 strokes along the same line using 2.5 pounds of pressure on the eraser, said hydrophobic characteristic being selected from the group consisting of a comparison of water contact angles before and after said test and a stain removal test using adhesive tape.

* * * * *